United States Patent [19]
Henbest

[11] 3,933,728
[45] Jan. 20, 1976

[54] MOULDING COMPOSITION

[75] Inventor: Richard George Cleveland Henbest, Runcorn, England

[73] Assignee: Imperial Chemical Industries Limited, London, England

[22] Filed: May 13, 1974

[21] Appl. No.: 469,664

[30] Foreign Application Priority Data
May 15, 1973 United Kingdom............... 23044/73

[52] U.S. Cl. ........ 260/37 N; 260/40 R; 260/40 TN; 260/859 R
[51] Int. Cl.$^2$.................... C08L 75/06; C08L 75/04
[58] Field of Search ....................... 260/37 N, 859 R

[56] References Cited
UNITED STATES PATENTS

| | | | |
|---|---|---|---|
| 3,050,482 | 8/1962 | Cobb et al. ................. | 260/859 R X |
| 3,644,569 | 2/1972 | Pietsch et al. ................ | 260/859 R X |
| 3,700,752 | 10/1972 | Hutchinson .................... | 260/859 R |

*Primary Examiner*—Lewis T. Jacobs
*Attorney, Agent, or Firm*—Cushman, Darby & Cushman

[57] ABSTRACT

A moulding composition is prepared by partially reacting a fluid mixture comprising
1. from 10% to 90% by weight of polyurethane precursors comprising at least one polyfunctional compound containing at least two isocyanate-reactive groups, at least one polyisocyanate, and at least one ethylenically unsaturated compound containing at least one group reactive with the polyfunctional compound and/or with the polyisocyanate, the ethylenically unsaturated compound being copolymerisable with the ethylenically unsaturated monomer in (2) and having a molecular weight of not greater than 750, and
2. from 90% to 10% by weight of polyester resin precursors comprising at least one ethylenically unsaturated polyester and at least one ethylenically unsaturated monomer copolymerisable therewith, in the mixture of polyfunctional compound, the polyisocyanate and the ethylenically unsaturated compound being reacted with each other, the ethylenically unsaturated monomer being substantially uncopolymerised with the ethylenically unsaturated compound and with ethylenically unsaturated polyester.

30 Claims, No Drawings

MOULDING COMPOSITION

This invention relates to a moulding composition.

In our British Pat. Specifications Nos. 1,272,984 and 1,279,673, the disclosures of which are incorporated herein, we have described, inter alia, moulding compositions, especially moulding compositions which are in the form of a shaped article of simple profile, e.g. a sheet, and which are formed by partially reacting a mixture of the precursors of a polyurethane and the precursors of a polyester resin. The polyurethane precursors, which may be such that when reacted alone they may be capable of forming a cross-linked or a linear urethane, comprise a mixture of at least one polyfunctional compound containing at least two isocyanate-reactive groups and at least one polyisocyanate containing at least two isocyanate groups. The polyester resin precursors comprise at least one ethylenically unsaturated polyester and at least one ethylenically unsaturated monomer copolymerisable with the polyester. The mixture of polyurethane precursors and polyester resin precursors is partially reacted to such an extent as to produce a moulding composition, that is, a composition which is capable of being shaped, and in which the partial reaction has preferably been effected to such an extent that the moulding composition is non-tacky. Preferably, in forming the moulding composition the polyfunctional compound and the polyisocyanate are reacted with each other substantially to completion and with the ethylenically unsaturated polyester, and the polyester and the monomer copolymerisable therewith are substantially uncopolymerised. In use, the moulding composition is shaped and the copolymerisation of the polyester and the monomer is substantially completed to produce a rigid shaped article.

In the aforementioned specifications the polyurethane precursors which have been described do not contain ethylenic unsaturation. We have now found that where the polyurethane precursors contain ethylenic unsaturation which is copolymerisable with the monomer of the polyester resin precursors then the rigid shaped article which is produced from the moulding composition possesses, in general, a higher heat distortion temperature than the rigid shaped article produced from a moulding composition as described in the aforementioned specifications.

According to the present invention there is provided a moulding composition prepared by partially reacting a fluid mixture comprising 1. from 10% to 90% by weight of polyurethane precursors comprising at least one polyfunctional compound containing at least two isocyanate-reactive groups, at least one polyisocyanate, and at least one ethylenically unsaturated compound containing at least one group reactive with the polyfunctional compound and/or with the polyisocyanate, the ethylenically unsaturated compound being copolymerisable with the ethylenically unsaturated monomer in (2) and having a molecular weight of not greater than 750, and
2. from 90% to 10% by weight of polyester resin precursors comprising at least one ethylenically unsaturated polyester and at least one ethylenically unsaturated monomer copolymerisable therewith, in the mixture the polyfunctional compound, the polyisocyanate and the ethylenically unsaturated compound being reacted with each other, the ethylenically unsaturated monomer being substantially uncopolymerised with the ethylenically unsaturated compound and with ethylenically unsaturated polyester.

In order to produce the moulding composition of the present invention the mixture of polyurethane precursors and polyester resin precursors should be partially reacted. Preferably, reaction is carried out to such an extent that the fluid mixture, which is generally a mobile liquid which is often sticky or tacky is converted into a non-tacky moulding composition and this conversion is suitably effected by reacting the polyfunctional compound, the polyisocyanate, and the ethylenically unsaturated compound in the polyurethane precursors with each other substantially to completion, and optionally with the ethylenically unsaturated polyester, where the polyester contains isocyanate-reactive groups, and ensuring that little if any copolymerisation of the ethylenically unsaturated monomer with the ethylenically unsaturated polyester or with the ethylenically unsaturated compound takes place.

In effecting the partial reaction it is essential to ensure that the ethylenically unsaturated compound in the polyurethane precursors reacts with the polyfunctional compound and/or with the polyisocyanate in the precursors. For this reason it is preferred that the ethylenically unsaturated compound contains at least one group readily reactive with the polyfunctional compound and/or with the polyisocyanate even at relatively low, e.g. ambient temperatures. Preferably, the ethylenically unsaturated compound contains at least one hydroxyl group as such compounds are readily reactive with the polyisocyanate. Of course, the ethylenically unsaturated compound may contain a group other than a hydroxyl group, for example, a carboxyl group, although in this case, as carboxyl groups are less reactive with polyisocyanates than are hydroxyl groups, forcing conditions, e.g. higher temperatures may have to be used to ensure reaction of the ethylenically unsaturated compound.

In effecting the partial reaction the ethylenically unsaturated polyester of the polyester resin precursors may optionally be reacted with the polyurethane precursors. For example, where the partial reaction is effected at or near ambient temperature and the polyester contains hydroxyl groups then these latter groups will generally react with the polyisocyanate. On the other hand, where the polyester contains carboxyl groups these groups will generally not react with the polyisocyanate at ambient temperature and if it is desired to react the polyester more forcing conditions, e.g. higher temperatures, may have to be used.

As reaction of the polyurethane precursors may generally be effected at relatively low temperatures, e.g. at temperatures from room temperature up to about 70°C, and the copolymerisation may be effected at higher temperatures, control of the partial reaction is suitably effected by control of temperature. The reaction of the polyurethane precursors may be assisted by suitable catalysts, e.g. tertiary amines and metal salts, e.g. stannous octoate and dibutyl tin dilaurate, and if desired, the copolymerisation of the ethylenically unsaturated monomer with the ehtylenically unsaturated polyester and the ethylenically unsaturated compound may be retarded by including suitable inhibitors in the fluid composition. The moulding composition may itself be in the form of a shaped article of simple profile e.g. a sheet, which may be formed by effecting the partial reaction of the components of the fluid mixture in a suitably shaped mould or on a moving support surface, e.g. a conveyor belt.

The mixture may contain catalysts which aid the subsequent copolymerisation of the ethylenically unsaturated monomer with the ethylenically unsaturated polyester and the ethylenically unsaturated compound, for example, free radical generators, suitably in a concentration of 0.5% to 5% by weight, e.g. peroxides, e.g. benzoyl peroxide, ditertiary butyl peroxide, cyclohexanone peroxide and tertiary butyl peroctoate, and visible light or ultraviolet sensitive photosensitisers. If desired, the mixture may also contain inhibitors for free-radical polymerisation in order to decrease or prevent premature copolymerisation between the ethylenically unsaturated monomer and the ethylenically unsaturated polyester and ethylenically unsaturated compound in the moulding composition. For this reason inhibitors are especially useful when the polyisocyanate, the polyfunctional compound and the ethylenically unsaturated compound are to be reacted at elevated temperature.

The moulding composition may be shaped or may be further shaped, as the case may be, for example, by causing the composition to conform to the contours of a mould, for example, by mechanical means, or pneumatically, or by a combination thereof. The moulding composition may be shaped, for example, by pressing between the co-operating parts of a mould, which may be heated if desired, or by draping over a mould. A suitable method of further shaping where the moulding composition is in the form of a sheet is vacuum forming in a mould. In order to aid shaping it may be desirable to heat the composition.

The thus shaped article may be removed from the mould and the copolymerisation of the ethylenically unsaturated monomer with the ethylenically unsaturated polyester and the ethylenically unsaturated compound completed, e.g. by heating in an oven, provided the article is able to retain its shape. Alternatively, and particularly if the thus further shaped article is not able to retain its shape unaided, the copolymerisation may be completed by further heating of the article while its shape is maintained by the mould in order to produce a rigid shaped article.

Polyfunctional compounds suitable for use as polyurethane precursors are described in the aforementioned specifications. The polyfunctional compound contains at least two isocyanate-reactive groups, e.g. —OH, —COOH, or —NH$_2$ groups, and preferably contains two to four such isocyanate-reactive groups. Hydroxyl groups are preferred as such groups are readily reactive with isocyanate groups thus facilitating the partial reaction to form the moulding composition of the present invention. Mixtures of two or more polyfunctional compounds may be used. Suitable polyfunctional compounds include, for example, polyols, e.g. polyether polyols and polyester polyols.

The polyisocyanate component of the polyurethane precursors comprises at least two isocyanate groups, and preferably two to four isocyanate groups. The polyisocyanate may be, for example, an aliphatic polyisocyanate, an aromatic polyisocyanate or a cycloaliphatic polyisocyanate, or may contain in the polyisocyanate at least two different types of isocyanate.

Suitable polyester resin precursors and proportions of ethylenically unsaturated polyester to ethylenically unsaturated monomer for use in such precursors are described in the aforementioned specifications. It is to be understood for the purposes of the present invention that where the composition from which the moulding composition is produced includes an ethylenically unsaturated monomer which contains at least one group reactive with the isocyanate or with the polyfunctional compound under the conditions used in preparing the moulding composition then that monomer is to be considered as forming, or forming part of, the ethylenically unsaturated compound of the polyurethane precursors and not as part of the polyester resin precursrs. In the polyester resin precursors the polyester may contain groups, e.g. —OH and/or —COOH groups which are reactive with the polyisocyanate.

The ethylenically unsaturated compound in the polyurethane precursors may be reactive with the polyisocyanate. For example, it may contain at least one —OH group. Thus, the ethylenically unsaturated compound may be a hydroxy alkyl acrylate or methacrylate of structure $CH_2\!\!=\!\!C(R_1)\!-\!COO(CH_2)_x\!-\!OH$, where $R_1$ is H or a methyl group and x is a whole number in the range, e.g. 2 to 10, or a derivative thereof in which the —CH$_2$— group carries one or more hydrocarbyl, especially alkyl, substituent groups. On the other hand, the ethylenically unsaturated compound may be reactive with the polyfunctional compound. For example, where the polyfunctional compound contains —OH, —COOH or —NH$_2$ groups, the ethylenically unsaturated compound may contain an isocyanate group. The ethylenically unsaturated compound may be reactive with both the polyfunctional compound and the polyisocyanate. For example, where the polyfunctional compound contains —OH or —NH$_2$ groups the ethylenically unsaturated compound may be an ethylenically unsaturated carboxylic acid, e.g. acrylic, methacrylic, fumaric, or itaconic acids, or it may be a carboxylic acid anhydride, e.g. maleic or itaconic anhydrides.

In the polyurethane precursors the ethylenically unsaturated compound may be a reaction product of an ethylenically unsaturated material and the polyfunctional compound or the polyisocyanate provided, of course, that the reaction product possesses at least one group reactive with the polyisocyanate and/or the polyfunctional compound.

For example, where the polyfunctional compound is a polyol the ethylenically unsaturated compound may be a reaction product of the polyol and, for example, an ethylenically unsaturated acid or anhydride. However, the thus reacted polyol must contain at least one hydroxyl group.

Thus, where the polyfunctional compound is a diol then the ethylenically unsaturated material should be reacted with the diol in order to leave, on average, at least one free hydroxyl group in the reaction product. Similarly, where the polyfunctional compound is a triol then no more than two of the hydroxyl groups in the triol should on average be reacted with the ethylenically unsaturated material.

The ethylenically unsaturated compound may contain more than one group reactive with the polyfunctional compound and/or the polyisocyanate.

In the polyurethane precursors the ethylenically unsaturated compound may itself be, or form part of, the polyfunctional compound, that is, it may contain two or more isocyanate-reactive groups, or it may itself be, or form part of, the polyisocyanate, that is, it may contain two or more isocyanate groups. For example, the ethylenically unsaturated compound may be a polyol, e.g. a reaction product of a triol and an ethylenically unsaturated carboxylic acid in which one of the hydroxyl groups in the triol has been reacted with the acid. Alternatively the ethylenically unsaturated compound may be a polyisocyanate, e.g. a reaction product of a triisocyanate and an ethylenically unsaturated alcohol or carboxylic acid in which one of the isocyanate groups in the triisocyanate has been reacted with the acid.

It is preferred that the ethylenically unsaturated compound in the polyurethane precursors is present in a proportion such that the ratio of the number of equivalents of ethylenic unsaturation provided by the ethylenically unsaturated compound to the number of moles of polyurethane precursors is in the range of 0.1 to 0.6 and more preferably in the range of 0.2 to 0.5.

The molecular weight of the ethylenically unsaturated compound in the polyurethane precursors may suitably be not greater than 600 and is preferably not greater than 500.

In the fluid mixture from which the moulding composition is produced the proportion of isocyanate groups to groups reactive with isocyanate may be in the range 0.8:1 to 1.2:1, preferably 0.9:1 to 1.1:1. These ranges are especially suitable where the polyurethane precursors are such as to be capable of forming a linear polyurethane, that is, where the polyfunctional compound and the polyisocyanate are difunctional. However, the proportion of isocyanate groups to groups reactive with isocyanate groups may be outside these ranges. It is especially suitable that the proportion should be outside these ranges where the polyurethane precursors are such as to be capable of forming a cross-linked polyurethane, that is, in the case where at least one of the polyisocyanate and/or the polyfunctional compound has a functionality of greater than two. Especially in the latter case the proportions of isocyanate groups to isocyanate-reactive groups may be outside, and even substantially outside the aforementioned ranges.

The moulding composition is preferably produced from a fluid mixture comprising from 20% to 80% by weight of the precursors of a polyurethane and from 80% to 20% by weight of the precursors of a cured polyester resin, and more preferably from 30% to 70% by weight of the precursors of a polyurethane and from 70% to 30% by weight of the precursors of a cured polyester resin.

The moulding composition of our invention may include fibrous reinforcing material in order that the properties of rigid articles prepared from the moulding composition may have improved properties, and in particular, improved impact strength and flexural properties.

The amount of fibrous material to be incorporated in the moulding composition will depend on the desired improvement in the particular property of the shaped rigid article produced from the composition which is of interest. In general from 5% to 50% or even 70% of firbrous material by weight of the total weight of the moulding composition including the fibrous material will suffice. Where it is desirable to effect a substantial improvement in properties from 20% to 50% by weight of fibrous material is preferred.

The fibrous materials may be incorporated into the composition by means which will be apparent to those versed in the art of reinforced resins and should desirably be mixed with the fluid mixture comprising the mixture of precursors when little or no reaction of the precursors has taken place.

Suitable fibrous reinforcing materials include glass, asbestos and carbon fibres and fibres of organic polymeric material, e.g. nylon or poly(ethylene terephthalate).

Glass fibres may be in any suitable form, e.g. in the form of a mat, ribbons, tapes continuous fibres or chopped rovings. Where chopped rovings are used they are preferably of at least ¼ inch in length.

The moulding composition may also include pigments and stabilisers e.g. antioxidants, antiozonants and ultraviolet stabilisers, and particulate reinforcing material, e.g. talc, mica, calcium carbonate, alumina and carbon black.

Where particulate reinforcing material is used it may suitably be used in a proportion of 5% to 50% or even 70% by weight, more preferably 20% to 50% by weight of the total weight of the moulding composition including the particulate material.

Suitable diols include, for example, alkylene glycols, e.g. ethylene glycol, propylene glycol, butylene glycol, neopentylene glycol and cyclohexane-1:3-diol; poly(alkylene glycols) e.g. diethylene glycol, triethylene glycol, dipropylene glycol; and higher molecular weight poly(alkylene glycols), e.g. poly(ethylene glycol) and poly(propylene glycol). The poly(alkylene glycols) should, of course, not be of such high molecular weight as to provide in the macromolecular chains of the resultant polymeric product units having a length greater than the defined maximum limit. Diols containing aromatic groups may also be used, e.g. diols having the structure

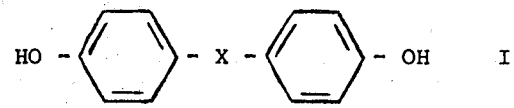

where X is a direct linkage or a divalent group, e.g. —SO$_2$—, —O— or

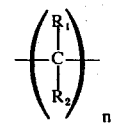

where n is a whole number, preferably 1 to 4, and $R_1$ and $R_2$ are selected from hydrogen atoms and hydrocarbyl, especially alkyl groups.

A preferred diol having the structure I is 2:2'-bis-(p-hydroxyphenyl)propane having the structure

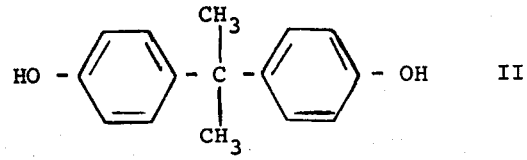

On account of the desirable properties of the polymeric products derived therefrom particularly preferred diols are oxyalkylated derivatives of the diols of structure I, that is diols having the structure:

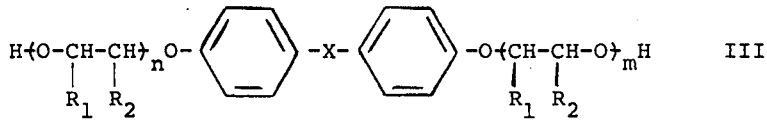 III where $R_1$ and $R_2$ are selected from hydrogen atoms and hydrocarbyl groups preferably alkyl groups e.g. methyl.

The value of $n + m$ preferably is such that the units in the resultant polymeric product derived from the diol provide an average of not more than 35 in-chain atoms in the macromolecular chains thereof.

A preferred diol having the structure III is an oxyalkylated derivative of 2:2'-bis(p-hydroxyphenyl)propane, that is, a diol of structure III in which X is

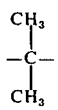

and in which $n + m$ is not greater than 8, preferably in the range 2 to 4. Particularly preferred is the oxypropylated derivative in which one of $R_1$ and $R_2$ is H and the other is $CH_3$ and $n + m$ is a whole number not greater than 8, preferably in the range 2 to 4. Suitably n and m are both whole numbers of 1 or 2.

If desired, one or both of the aromatic groups in the diol of structures I, II and III may be fully saturated.

Suitable diacids include, for example, succinic, adipic, gluaric and sebacic acids, isophthalic acid and terephthalic acid, or mixtures thereof.

As examples of the diisocyanate component of the polyurethane precursors there may be mentioned 4:4'-dicyclohexylmethane diisocyanate, hexamethylene diisocyanate, 2:4-toluene diisocyanate, 2:6-toluene diisocyanate or a mixture of said toluene diisocyanates.

Where polymeric products having high impact strength and good flexural properties are desired a preferred diisocyanate is one having the structure:

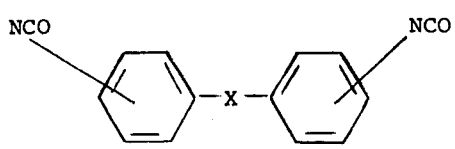

where X is a divalent group. X may be for example, a group having the structure:

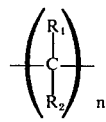

where n is a whole number preferably 1 to 3, and $R_1$ and $R_2$ are selected from hydrogen atoms and hydrocarbyl groups, for example, alkyl, e.g. methyl. A preferred diisocyanate is 4:4'-diphenylmethane diisocyanate.

The ethylenically unsaturated polyester may be derived for example, by esterification of an unsaturated dicarboxylic acid or mixture of such acids with a saturated glycol or mixture of such glycols, or by esterification of a saturated dicarboxylic acid or mixture of such acids with an unsaturated glycol or mixture of such glycols. If desired an unsaturated acid or acids may be used together with or in place of the saturated acid or acids, and an unsaturated glycol or glycols may be used together with or in place of the saturated glycol or glycols. An anhydride may be used in place of the corresponding dicarboxylic acid. Examples of unsaturated polyesters include, for example those formed by esterification of maleic, fumaric or itaconic acids, or mixtures thereof with each other and/or with saturated dicarboxylic acids with, for example, ethylene glycol, propylene glycol or butylene glycol, or mixtures thereof with each other and/or other dihydric alcohols. Unsaturated polyesters that may be mentioned in particular are condensates of isophthalic acid and fumaric acid with propylene glycol, condensates of maleic anhydride and phthalic anhydride with propylene glycol and optionally with ether diethylene glycol or adipic acid, and condensates of propylene glycol with fumaric acid or maleic acid and optionally also with phthalic anhydride.

Examples of suitable monomers copolymerisable with the ethylenically unsaturated groups in the polyester include vinyl monomers, for example, vinyl esters, aromatic vinyl compounds and vinyl nitriles. Suitable vinyl esters include, for example, vinyl acetate and esters of acrylic acid having the formula $CH_2 = CH - COOR$, where R is an alkyl, aryl, alkaryl, aralkyl or cycloalkyl group. For example, R may be an alkyl group having from 1 to 20, and preferably 1 to 10 carbon atoms. Particular vinyl esters which may be mentioned include for example, methyl acrylate, ethyl acrylate, n- and iso-propyl acrylates, and n-, iso- and tertiary-butyl acrylates.

Other suitable vinyl esters include, for example, esters of formula $CH_2 = C(R') COOR$, where $R'$ may be an alkyl, aryl, alkaryl, aralkyl or cycloalkyl group. In the ester of formula $CH_2 = C(R') COOR$, R and $R'$ may be the same or different. Particular vinyl esters which may be mentioned include, for example, methyl methacrylate, ethyl methacrylate, n- and iso-propyl methacrylate, and n-, iso and tertiary-butyl methacrylate.

Aromatic vinyl compounds which may be mentioned include for example, styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile.

Polyfunctional vinyl monomers, that is, monomers containing two or more vinyl groups are also suitable. Suitable monomers include, for example, glycol dimethacrylate, divinyl benzene and diallyl phthalate.

The proportion of monomer copolymerisable with the ethylenically unsaturated polyester to ethylenically unsaturated polyester in the cured polyester resin precursors may, for example, be in the range 30% to 90% by weight of at least one ethylenically unsaturated polyester to 70% to 10% by weight of at least one monomer copolymerisable therewith. More suitably, the said precursors comprise from 50% to 70% by weight of at least one ethylenically unsaturated polyester and from 50% to 30% by weight of at least one monomer copolymerisable therewith.

The invention is now illustrated by the folloiwng Examples in which all parts are expressed as parts by weight.

EXAMPLE 1

Equal parts by weight of propylene glycol and maleic anhydride were mixed in a vessel and heated at 70°C for 2 hours and then allowed to stand at 50°C for 5 days. The product was a clear viscous liquid which was shown by nuclear magnetic resonance spectroscopic examination to be free of unreacted maleic anhydride or maleic acid.

A resin mixture of the following components was made up in a vessel; 6.2 parts of the propylene glycol/maleic anhydride adduct, 40.4 parts of an ethylenically unsaturated polyester having an acid value of 50.8 mg KOH $g^{-1}$ and a hydroxyl value of 69.3 mg KOH $g^{-1}$ and formed from fumaric acid, isophthalic acid and propylene glycol (fumaric acid:isophthalic acid molar ratio 3:1), 30.8 parts of styrene, 9.25 parts of oxypropylated bisphenol-A having a hydroxyl value of 333 mg KOH $g^{-1}$, 13.35 parts of a polyisocyanate containing 4:4'-diphenyl methane diisocyanate and having an average isocyanate functionality of 2.7 and an isocyanate value of 409 mg KOH $g^{-1}$ (Suprasec DN, Imperial Chemical Industries Limited), 1 part of tertiary butyl peroctoate and 0.1 part of hydroquinone (as a 33% by weight solution in triethylene glycol).

The resin mixture was blended with 100 parts of powdered calcium carbonate and formed into laminate with 50 parts of 25 mm chopped "E" glass fibres between polyethylene films. The resin containing calcium carbonate and glass fibre was allowed to stand at room temperature for 24 hours and the polyethylene films were then removed to leave a non-tacky, pliable, readily mouldable sheet.

The mouldable sheet was compression moulded at 135°C for 15 minutes under an applied pressure of 150 lb.sq.in$^{-1}$ to form a ⅛ inch thick rigid sheet.

The above procedure was repeated to form a ⅛ inch thick rigid sheet except that the calcium carbonate and glass fibre were omitted, that is, the sheet was formed from the resin mixture alone, and the heat distortion temperature of the sheet was measured using ASTM D648 at 264 lb.sq.in$^{-1}$. The heat distortion temperature was 104°C.

EXAMPLE 2

The procedure of Example 1 was followed except that the polyester which was used had an acid value of 37.1 mg KOH $g^{-1}$ and a hydroxyl value of 51.7 mg KOH $g^{-1}$, and 9 parts of oxypropylated bisphenol-A, 6.5 parts of propylene glycol/maleic anhydride adduct, 31.3 parts of styrene and 13 parts of polyisocyanate were used.

The resultant non-tacky, pliable, readily mouldable sheet was moulded and heated following the procedure described in Example 1 to produce a ⅛ inch thick rigid sheet.

The above procedure was followed to form a ⅛ inch thick rigid sheet except that the calcium carbonate and glass fibre were omitted, that is, the rigid sheet was formed from the resin mixture alone. The heat distortion temperature of this rigid sheet was 100°C.

EXAMPLE 3

The procedure of Example 1 was followed except that 6.7 parts of oxypropylated bisphenol-A, 8.75 parts of propylene glycol/maleic anhydride adduct, 150 parts of powdered calcium carbonate, and 6 mm long glass fibre were used, and in place of the procedure as used in Example 1, the resin mixture was mixed with the calcium carbonate and glass fibre in a Z-blade mixer and the resultant mixture was cast between polyethylene sheets to form a pliable, non-tacky, readily mouldable sheet after standing at room temperature for 24 hours. The mouldable sheet was compression moulded following the procedure described in Example 1 to form a rigid sheet.

The above procedure was followed to form a ⅛ inch thick rigid sheet except that the calcium carbonate and glass fibre were omitted. The heat distortion temperature of this rigid sheet was 96°C.

EXAMPLE 4

The procedure of Example 1 was followed except that 32.6 parts of styrene and 9.4 parts of polyisocyanate were used, the oxypropylated bisphenol-A was omitted, and in place of the adduct of propylene glycol and maleic anhydride there was used 17.6 parts of an adduct prepared by reacting equimolar proportions of trimethylol propane of molecular weight 310 and maleic anhydride at 70°C for 2 hours and at 50°C for 5 days.

The resultant non-tacky, pliable, readily mouldable sheet was compression moulded following the procedure described in Example 1 to produce a rigid sheet.

The above procedure was followed to produce a ⅛ inch thick rigid sheet except that the calcium carbonate and glass fibre were omitted. The heat distortion temperature of this rigid sheet was 86°C.

EXAMPLE 5

The procedure of Example 1 was followed except that 33.1 parts of styrene, 10 parts of polyisocyanate and, in addition, 0.3 part of stannous octoate were used. Furthermore, the propylene glycol/maleic anhydride adduct used in Example 1 was replaced by 16.5 parts of an adduct formed by reacting oxypropylated glycerol of molecular weight 310 with maleic anhydride in a molar proportion of 2:3 at 70°C for 2 hours and at 50°C for 5 days.

The resin was compounded with calcium carbonate and glass fibre fllowing the procedure described in Example 1 and allowed to stand between polyethylene sheets at room temperature for 3 days to produce a non-tacky, pliable, readily mouldable sheet. The sheet was then compression moulded at 135°C for 15 minutes under an applied pressure of 150 lb.sq.in$^{-1}$ to produce a rigid ⅛ inch thick sheet.

The above procedure was followed to produce a ⅛ inch thick rigid sheet except that the calcium carbonate and glass fibre were omitted. The heat distortion temperature of this rigid sheet was 104°C.

EXAMPLE 6

Following the procedure of Example 1 a 3 mm thick pliable, readily mouldable sheet was prepared from 40.4 parts of ethylenically unsaturated polyester as used in Example 1, 32.8 parts of styrene, 8.8 parts of polyisocyanate as used in Example 1, 1 part of tertiary butyl peroctoate, 0.3 part of stannous octoate and 0.1 part of hydroquinone (as a 33% by weight solution in triethylene glycol), and 18 parts of an adduct formed by reacting equimolar amounts of trimethylol propane having a molecular weight of 310 and methyl nadic anhydride at 70°C for 2 hours and 50°C for 5 days, the calcium carbonate and glass fibre as used in Example 1 being omitted.

The mouldable sheet was compression moulded following the procedure described in Example 1 to produce a rigid sheet having a heat distortion temperature of 102°C. By way of comparison in three separate experiments the procedure of Example 1 was used to prepare pliable, readily mouldable sheets from the following resin mixtures in each of which the adduct of propylene glycol and maleic anhydride was omitted.

| Experiment | A | B | C |
| --- | --- | --- | --- |
| Ethylenically unsaturated polyester, parts | 43.4 | 43.4 | 40.4 |
| Styrene, parts | 26.6 | 26.6 | 29.6 |
| Polyisocyanate, parts | 12.5 | 18.8 | 12.5 |
| Oxypropylated bisphenol-A, parts | 17.5 | 5.6 | 17.5 |
| Propylene glycol, parts | — | 5.6 | — |
| Tertiary butyl peroctoate, parts | 1 | 1 | 1 |
| Hydroquinone, parts | 0.1 | 0.1 | 0.1 |

In each experiment the mouldable sheets were compression moulded to rigid sheets following the procedure described in Example 1. The heat distortion temperatures of the rigid sheets were, respectively, 78°C, 66°C and 70°C.

What we claim is:

1. A moulding composition which is formed by partially reacting a fluid mixture comprising
   a. from 10% to 90% by weight of polyurethane precursors comprising at least one polyfunctional compound containing at least two isocyanate-reactive groups, at least one polyisocyanate, and at least one ethylenically unsaturated compound containing at least one group reactive with the polyfunctional compound and/or with the polyisocyanate, the ethylenically unsaturated compound being copolymerisable with the ethylenically unsaturated monomer in (b) and having a moleculor weight of not greater than 750, and;
   b. from 90% to 10% by weight of polyester resin precursors comprising at least one ethylenically unsaturated polyester and at least one ethylenically unsaturated monomer copolymerisable therewith, in the mixture the polyfunctional compound, the polyisocyanate and the ethylenically unsaturated compound being reacted with each other, the ethylenically unsaturated monomer being substantially uncopolymerised with the ethylenically unsaturated compound and with ethylenically unsaturated polyester, wherein the ethylenically unsaturated compound of (a) is different from said ethylenically unsaturated monomer of said polyester precursor, in which the molar proportion of isocyanate groups in the diisocyanate to groups reactive with isocyanate groups in the polyfunctional compound plus ethylenically unsaturated polyester is in the range 0.8:1 to 1.2:1 and in which the amount of the ethylenically unsaturated compound in the polyurethane precursors is such that the number of equivalents of ethylenic unsaturation provided by the compound to the number of moles of polyurethane precursors is in the range 0.1 to 0.6.

2. A moulding composition as claimed in claim 1 which is formed from 20% to 80% by weight of polyurethane precursors and 80% to 20% by weight of cured polyester resin precursors.

3. A moulding composition as claimed in claim 1 which is formed from 30% to 70% by weight or greater of polyurethane precursors and 70% to 30% by weight or less of cured polyester resin precursors.

4. A moulding composition as claimed in claim 1 in which said molar proportion is in the range 0.9:1 to 1.1:1.

5. A moulding composition as claimed in claim 1 in which in the polyurethane precursors the diisocyanate is 4:4'-diphenyl methane diisocyanate.

6. A moulding composition as claimed in claim 1 in which in the polyurethane precursors the diisocyanate is dicyclohexyl methane diisocyanate, hexamethylene diisocyanate, 2:4-toluene diisocyanate or 2:6-toluene diisocyanate, or a mixture of said toluene diisocyanates.

7. A moulding composition as claimed in claim 1 in which in the polyurethane precursors the polyfunctional compound is a diol.

8. A moulding composition as claimed in claim 7 in which the diol has the structure

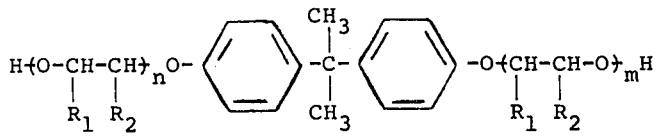

where $R_1$ and $R_2$ are selected from hydrogen atoms and hydrocarbyl groups and $n$ and $m$ are each whole numbers, $n$ plus $m$ being in the range 2 to 4.

9. A moulding compositoin as claimed in claim 8 in which one of $R_1$ and $R_2$ is H and the other is methyl.

10. A moulding composition as claimed in claim 7 in which the diol is poly(ethylene glycol).

11. A moulding composition as claimed in claim 1 in which in the polyurethane the polyfunctional compound is a saturated polyester.

12. A moulding composition as claimed in claim 1 in which in the polyurethane precursors said ethylenically unsaturated compound contains at least one group reactive with the polyisocyanate.

13. A moulding composition as claimed in claim 12 in which the ethylenically unsaturated compound in the polyurethane precursor contains at least one -OH group.

14. A moulding composition as claimed in claim 13 in which the ethylenically unsaturated compound has the structure $CH_2=C(R_1)—COO(CH_2)_x—OH$ where $R_1$ is hydrogen or methyl and $x$ is a whole number in the range 2 to 10.

15. A moulding composition as claimed in claim 1 in which the ethylenically unsaturated compound in the polyurethane precursors is the reaction product of an ethylenically unsaturated material and the polyfunctional compound, the reaction product containing at least one group reactive with the polyisocyanate.

16. A moulding composition as claimed in claim 15 in which the ethylenically unsaturated compound is the reaction product of a polyol and an ethylenically unsaturated acid or anhydride.

17. A moulding composition as claimed in claim 16 in which the ethylenically unsaturated compound is the reaction product of an alkylene glycol and maleic acid or maleic anhydride.

18. A moulding composition as claimed in claim 17 wherein the alkylene glycol is propylene glycol.

19. A moulding composition as claimed in claim 1 wherein the ethylenically unsaturated compound is itself or is part of the polyfunctional compound in the polyurethane precursors.

20. A moulding composition as claimed in claim 1 in which the amount of the ethylenically unsaturated compound is such that the ratio is in the range 0.2 to 0.5.

21. A moulding composition as claimed in claim 1 in which the molecular weight of the ethylenically unsaturated compound is not greater than 600.

22. A moulding composition as claimed in claim 21 wherein the molecular weight of the ethylenically unsaturated compound is not greater than 500.

23. A moulding composition as claimed in claim 1 which contains fibre reinforcement.

24. A process for the production of a shaped polymeric article which comprises polymerising a homogenous mixture of the precursors of a linear polyurethane and the precursors of a cured polyester resin according to claim 1 and shaping the mixture before the polymerisation has proceeded to the extent that the mixture is intractable.

25. A process for the production of a shaped polymeric article which comprises reacting at least one difunctional compound, at least one diisocyanate, at least one ethylenically unsaturated compound which is reactive with the diisocyanate, and at least one ethylenically unsaturated polyester as in claim 1, forming a homogeneous mixture of the thus formed product and at least one monomer copolymerisable with the ethylenically unsaturated groups in the polyester and in the ethylenically unsaturated compound, causing or allowing the resultant mixture to react, and shaping the mixture before the reaction has proceeded to the extent that the mixture is intractable.

26. A process for the production of a shaped polymeric article which comprises the steps of
   a. performing a shaping operation on a moulding composition as claimed in claim 1, and
   b. causing or allowing the thus shaped article to retain its shape while completing copolymerisation of the ethylenically unsaturated monomer with the ethylenically unsaturated groups in the polyester and in the ethylenically unsaturated compound.

27. A process as claimed in claim 26 in which the moulding composition is in the form of a sheet.

28. A process as claimed in claim 26 in which the moulding composition is in a particular form.

29. The moulding composition of claim 1, wherein the ethylenically unsaturated monomer of (b) is styrene.

30. The moulding composition of claim 1, wherein the reactive group of said ethylenically unsaturated compound of (a) is a —OH, isocyanate-, COOH— or carboxylic anhydride.

* * * * *